(12) United States Patent
Wen

(10) Patent No.: US 6,922,207 B2
(45) Date of Patent: Jul. 26, 2005

(54) 3-DIMENSION SCANNING METHOD AND 3-DIMENSION SCANNING SYSTEM USING THE SAME

(75) Inventor: Cheng Wen, Taipei (TW)

(73) Assignee: Xsense Technology Corp., Taipei (TW)

( * ) Notice: Subject to any disclaimer, the term of this patent is extended or adjusted under 35 U.S.C. 154(b) by 8 days.

(21) Appl. No.: 10/758,086

(22) Filed: Jan. 16, 2004

(65) Prior Publication Data

US 2004/0179095 A1 Sep. 16, 2004

(30) Foreign Application Priority Data

Jan. 17, 2003 (TW) .......................... 92100973 A

(51) Int. Cl.$^7$ .......................... H04N 7/18; G01B 11/24
(52) U.S. Cl. .......................... 348/46; 348/42; 382/154
(58) Field of Search .......................... 348/42, 46–47, 348/86, 135; 382/154; 356/3.1, 12; 352/57; 396/324; 345/419, 441

(56) References Cited

U.S. PATENT DOCUMENTS

| | | | | |
|---|---|---|---|---|
| 5,561,526 A | * | 10/1996 | Huber et al. | 356/604 |
| 5,852,672 A | * | 12/1998 | Lu | 382/154 |
| 6,256,099 B1 | * | 7/2001 | Kaufman et al. | 356/603 |
| 6,510,244 B2 | * | 1/2003 | Proesmans et al. | 382/203 |
| 2002/0057438 A1 | * | 5/2002 | Decker | 356/601 |

OTHER PUBLICATIONS

Wang, Y.F., "Characterizing three–dimensional surface structures from visual images", IEEE Transactions on Pattern Analysis and Machine Intelligence, vol. 13, Issue:1, pp. 52–60, Jan. 1991.*

Proesmans, M. et al, "Active acquisition of 3D shape for moving objects", International Conference on Image Processing, vol. 3, pp. 647–650, Sep. 1996.*

* cited by examiner

Primary Examiner—Vu Le
(74) Attorney, Agent, or Firm—Troxell Law Office, PLLC

(57) ABSTRACT

The present invention provides a 3-dimension scanning system, for scanning an input image, which comprises: an input unit, for getting a 3-dimension picture data according to the input image; a process unit, coupled to the input unit, for storing and integrating the 3-dimension picture data, and translating the 3-dimension picture data into a 3-dimension motion control signal to output after processing; and an output unit, coupled to the process unit, for receiving the 3-dimension motion control signal and outputting at least one Laser pulse to an object according to the 3-dimension motion control signal. Furthermore, the present invention also provides a 3-dimension scanning method.

8 Claims, 4 Drawing Sheets

3-DIMENSION SCANNING METHOD AND 3-DIMENSION SCANNING SYSTEM USING THE SAME

FIELD OF THE INVENTION

The present invention relates generally to a 3-dimension scanning system and a 3-dimension method, more particularly, to a 3-dimension scanning system and a 3-dimension method which uses optical grating and two digital cameras to capture image, and synthesizes the images captured by the digital cameras into a 3-dimension image by software scanning technology, and then uses a 3-dimension error diffusion distributed table to execute point cloud and outputs the point cloud data to an object by Laser pulse form.

BACKGROUND OF THE INVENTION

The traditional 3-dimension scanning system using Laser beam non-conductive measuring method or mechanical conductive measuring method to measure the 3-D image data of an object, which is especially suitable for static object scanning, such as mobile, mold model etc., wherein, the advantage of the Laser beam is accurate, but it is expensive, and the Laser beam also easy harms the eyes or skin of the human, while the mechanical conductive measuring method although is cheap, but it's accuracy is insufficient and easy scrapes the skin, therefore, it is not suitable to be used to scan the face or body of the human.

Therefore, it needs a 3-dimension scanning system and a 3-dimension method, which uses optical grating and two digital cameras to capture images, and synthesizes the images captured by the digital cameras into a 3-dimension image by software scanning technology, and then uses a 3-dimension error diffusion distributed table to execute point cloud and outputs the point cloud data to object by Laser pulse form.

SUMMARY OF THE INVENTION

To solve the above problems, it is an object of the present invention to provide a 3-dimension scanning method to accurately scan a 3-dimension image data of an object.

To solve the above problems, it is another object of the present invention to provide a 3-dimension scanning system to accurately scan a 3-dimension image data of an object.

To accomplish the above object of the present invention, the 3-dimension scanning system comprises: an input unit, for getting a 3-dimension picture data according to the input image; a process unit, coupled to the input unit, for storing and integrating the 3-dimension picture data, and translating the 3-dimension picture data into a 3-dimension motion control signal output after processing; and an output unit, coupled to the process unit, for receiving the 3-dimension motion control signal and outputting at least one Laser pulse to an object according to the 3-dimension motion control signal.

To accomplish the above object of the present invention, the 3-dimension scanning method comprises the following steps: (a) using an input unit, for getting a 3-dimension picture data of an enlarged capture surface of the object; (b) inputting the 3-dimension picture data to a process unit, and using a gray level application program of the process unit to determine a point coordinate of the 3-dimension picture data; and (c) establishing a 3-dimension error diffusion distributed table to execute point cloud.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
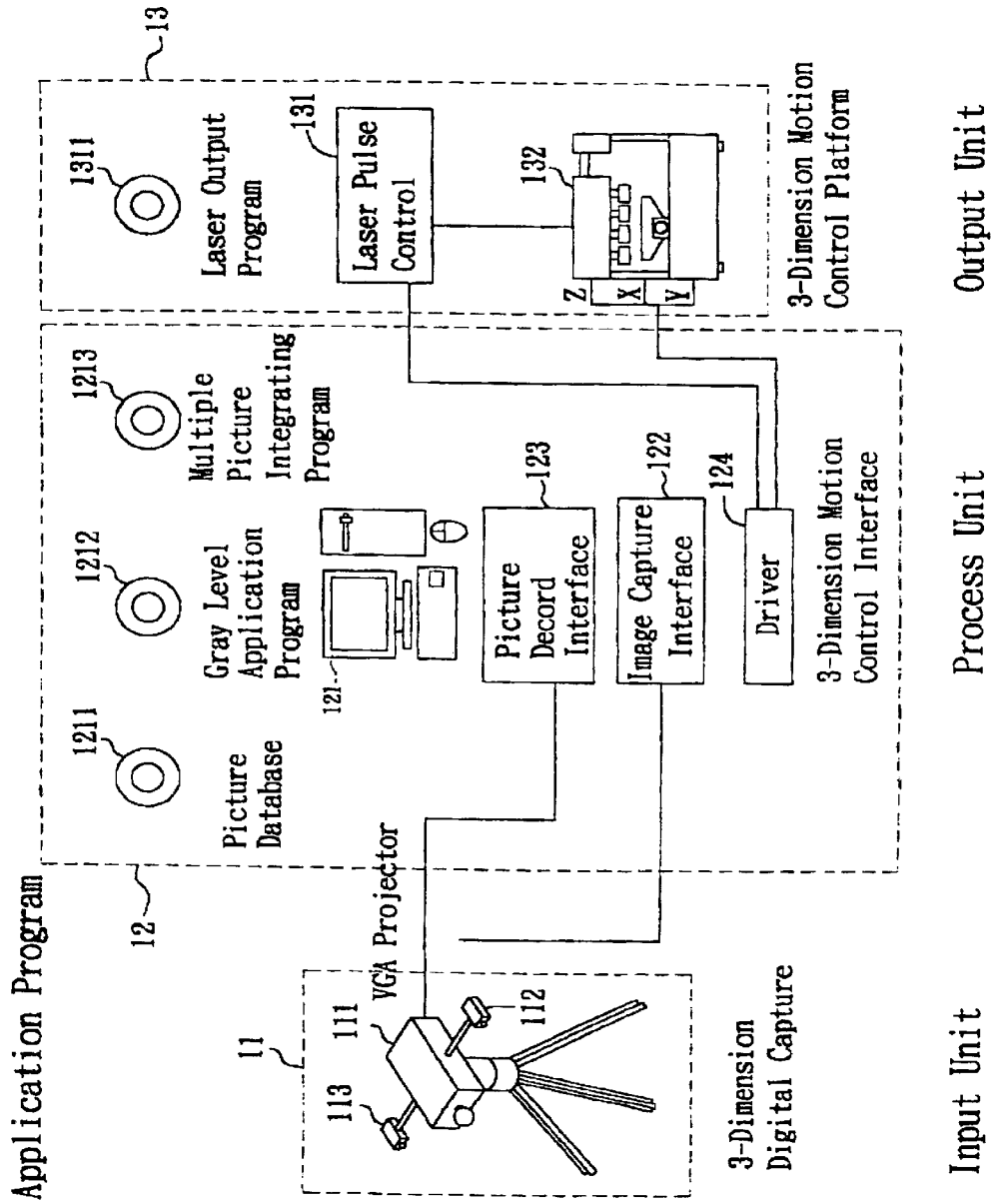
FIG. 1 shows a diagram of a 3-dimension scanning system in accordance with one embodiment of the present invention.

Referring to FIG. 1, which shows a diagram of a 3-dimension scanning system in accordance with one embodiment of the present invention. As shown in FIG. 1, the 3-dimension scanning system, which comprises : an input unit 11; a process unit 12 and an output unit 13.

Wherein, the input unit 11 further comprises: a VGA projector 111, for outputting an optical grating to an object waiting for scanning; and at least one digital camera 112, 113, positioned at both sides of the VGA projector 111, for getting a 2-dimension image data from the object waiting for scanning according to the optical grating. Wherein, the optical grating density of the VGA projector 111 is adjustable, such as 10 or 20 lines, thereby; the VGA projector 111 can get an image data with different resolutions.

The process unit 12 further comprises: a personal computer 121, having a picture database 1211, a gray level application program 1212 and a multiple pictures integrating program 1213; wherein, the picture database 1211 is used to store the picture data captured by the VGA projector 111; the gray level application program 1212 gets the 3-dimension gray level image data from the picture data according to the gray level processing algorithm (describing as behind); while the multiple pictures integrating program 1213 integrates the multiple pictures together if requires; an image capture interface 122, positioned inside the personal computer 121 and coupled to the digital camera 112, 113 for getting the 2-dimension image data of the object; a picture decode interface 123, coupled to the VGA projector 111, for decoding the 2-dimension image data and getting the 3-dimension picture data, and then outputting to the picture database 1211 for storing; and a 3-dimension motion control interface 124 for example but not limited to a driver card, for outputting the 3-dimension motion control signal to the output unit 13 according to the 3-dimension picture data.

The output unit 13 further comprises: a Laser pulse control apparatus 131, coupled to the 3-dimension moving control interface 124, having a Laser beam output program 1311 to output the Laser pulse according to the 3-dimension moving control signal; a 3-dimension moving control platform 132, coupled to the Laser pulse control apparatus 131, for outputting the Laser pulse to the object. Wherein, the object preferably is made of transparent material such as glass, crystal or acrylic plastic.

Figure 2:
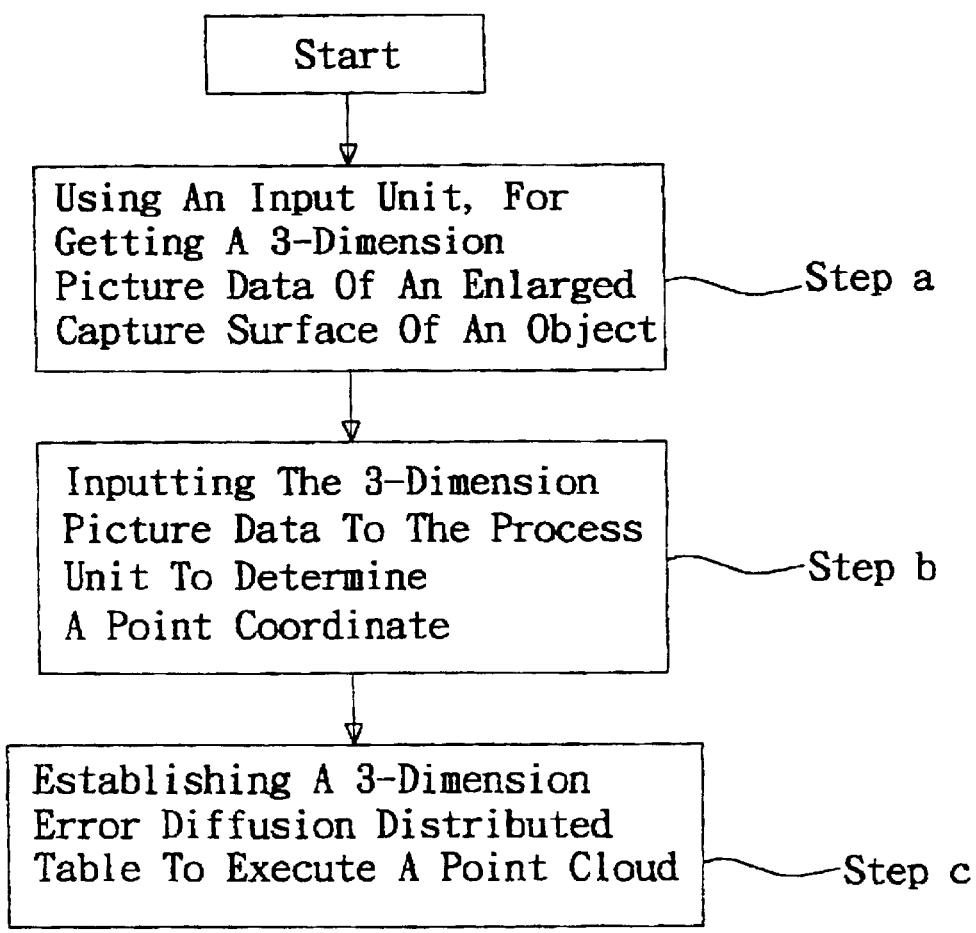
FIG. 2 shows a flowchart of a 3-dimension scanning method in accordance with one embodiment of the present invention.
Figure 3:
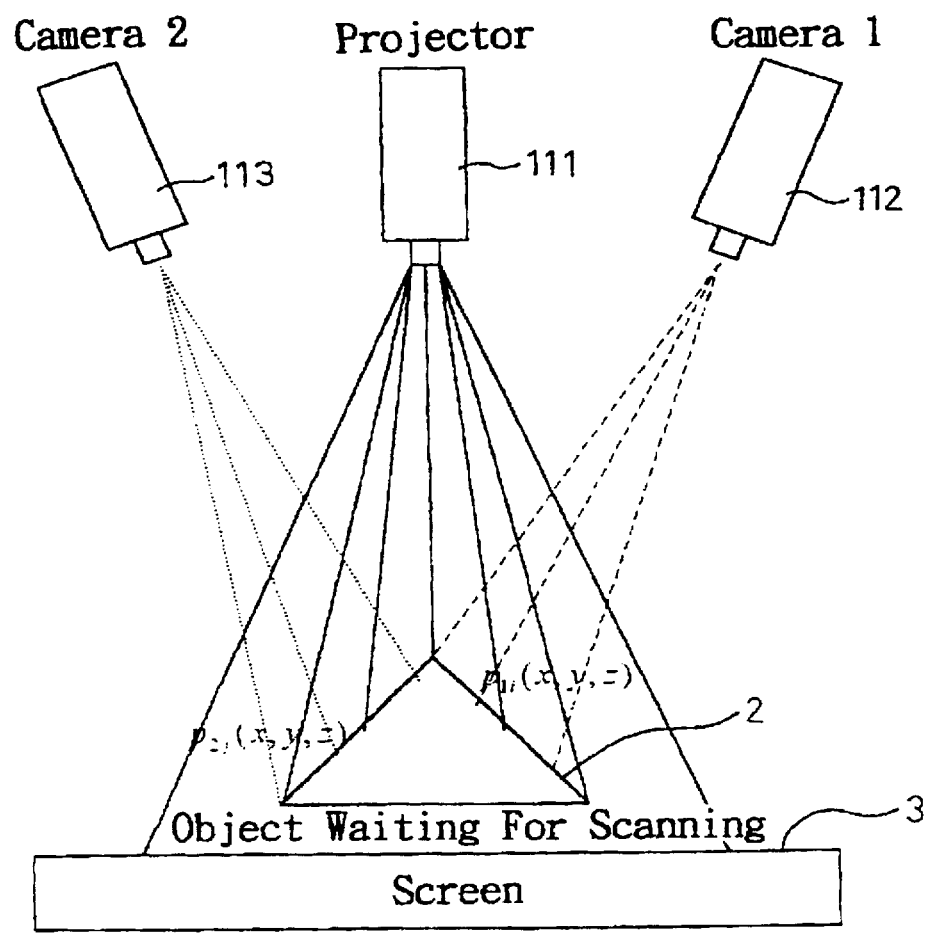
FIG. 3 shows a diagram of capturing image of a 3-dimension scanning method in accordance with one embodiment of the present invention.

Referring to FIG. 2, which shows a flowchart of a 3-dimension scanning method in accordance with one embodiment of the present invention. As shown in FIG. 3, the method for scanning a 3-dimension object, for scanning an input image of an object and translating it into a 3-dimension picture data then outputting at least one laser pulse to an object, which comprises the following steps: (a) using an input unit 11, for getting a 3-dimension picture data of an enlarged capture surface of the object; (b) inputting the 3-dimension picture data to a process unit 12, and using a gray level application program 1212 of the process unit 12 to determine a point coordinate of the 3-dimension picture data; and (c) establishing a 3-dimension error diffusion distributed table to execute point cloud.

Referring to FIG. 3, which shows a diagram to capture image of a 3-dimension scanning method in accordance with one embodiment of the present invention. As shown in FIG. 3, the 3-dimension scanning method of the present invention, wherein, the input unit 11 and the process unit used in steps (a) and (b) have the same elements as shown in FIG. 1. As shown in FIG. 3, the VGA projector 111 used in step. (a) outputs an optical grating to an object 2 waiting for scanning and a screen 3, and uses two digital cameras 112,113 to get a 3-dimension image data of the enlarged capture surface. The principle of this 3-dimension scanning method is describing as following:

$p_{1i}(x, y, z)$: the point coordinate of the image captured by the digital camera;

$0 \leq i \leq v_1$: effective point number of the image 1;

$p_{2j}(x, y, z)$: the point coordinate of the image captured by the digital camera 113;

$0 \leq j \leq v_2$: effective point number of the image 2;

$(x_{1min}, y_{1min}, z_{1min}) \leq p_{1i}(x, y, z) \leq (x_{1max}, y_{1max}, z_{1max})$: determining the effective window range of the image 1;

$(x_{2min}, y_{2min}, z_{2min}) \leq p_{2j}(x, y, z) \leq (x_{2max}, y_{2max}, z_{2max})$: determining the effective window range of the image 2;

therefore, the range of the image 1 captured by the digital camera 112 and the image 2 captured by the digital camera 113 can respectively be got according to aforesaid principle.

Figure 4:
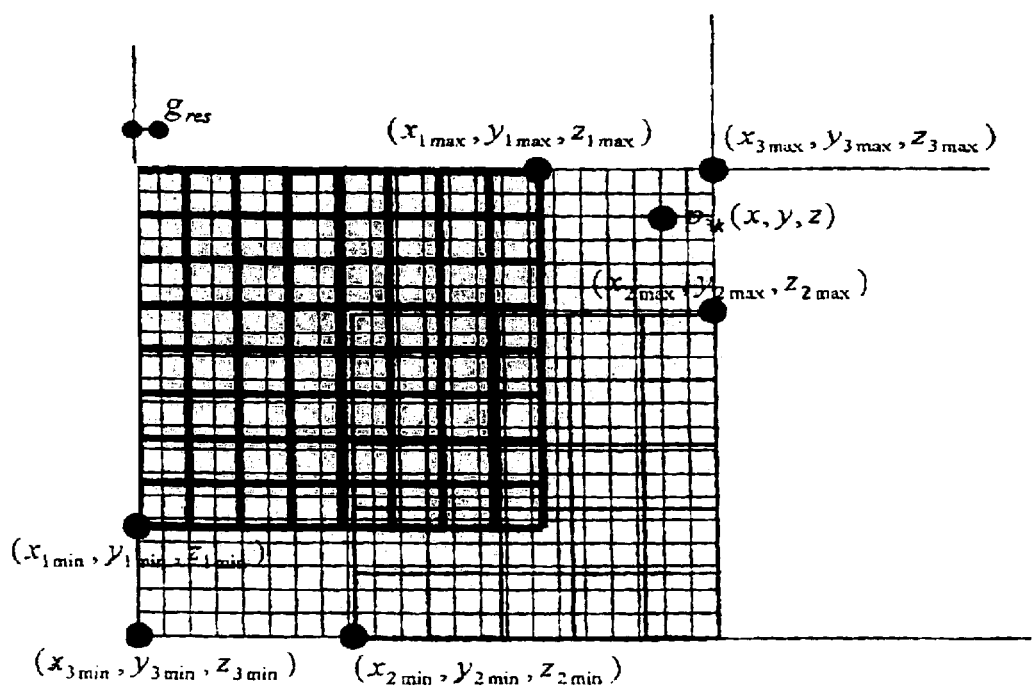
FIG. 4 shows a diagram of image synthesizing of the 3-dimension scanning method in accordance with one embodiment of the present invention.

Referring to FIG. 4, which shows a diagram of image synthesizing of the 3-dimension scanning method in accordance with one embodiment of the present invention. As shown in FIG. 4, the step (b) of the 3-dimension scanning method of the present invention, the range of the image1, image2 are inputted to the process unit 12 prior, and cooperating with the 3-dimension picture data got by the density of the optical grating also being inputted to the process unit 12, then uses the gray level application program 1212 of the process unit 12 to execute the gray level processing of the image1, image2 so as to determine the point coordinate of the 3-dimension picture data. The principle of this is describing as following:

determining the $(x_{3min}, y_{3min}, z_{3min})$ and $(x_{3max}, y_{3max}, z_{3max})$ from the $(x_{1min}, y_{1min}, z_{1min})$, $(x_{1max}, y_{1max}, z_{1max})$, $(x_{2min}, y_{2min}, z_{2min})$ and $(x_{2max}, y_{2max}, z_{2max})$, and determining the point coordinate of the point cloud $p_{3k}(x, y, z)$ according to the density $g_{res}$ of the gray level application program 1212, and $(x_{3min}, y_{3min}, z_{3min})$, $(x_{3max}, y_{3max}, z_{3max})$, and then the coordinate of the synthesizing points are:

$$\tilde{x}_{3k} := B_x(p_{1i}(x, y, z), p_{2j}(x, y, z), x_{1i}, x_{2j}) \cdot x_{3k}$$

$$\tilde{y}_{3k} := B_y(p_{1i}(x, y, z), p_{2j}(x, y, z), y_{1i}, y_{2j}) \cdot y_{3k}$$

$$\tilde{z}_{3k} := B_z(p_{1i}(x, y, z), p_{2j}(x, y, z), z_{1i}, z_{2j}) \cdot z_{3k}$$

wherein, the $B_{x, y, z}$ are the effective Boolean functions of the 3-dimension scanning method.

Wherein, in the step (c), we can establish a 3-dimension error diffusion distributed table $T(i, j, k)$ to execute Halftone point cloud according to the point coordinates $\tilde{x}_{3k}$, $\tilde{y}_{3k}$ and $\tilde{z}_{3k}$, and respectively adjust the bright and the contrast so that the 3-dimension image data can be outputted to an object by Laser pulse form to present the 3-dimension image of the object.

While the invention has been described with reference to a preferred embodiment thereof, it is to be understood that modifications or variations may be easily made without departing from the spirit of this invention, which is defined by the appended claims.

What is claimed is:

1. A 3-dimension scanning system, for scanning an input image, which comprises:

an input unit, for getting a 3-dimension picture data according to the input image;

a process unit, coupled to said input unit, for storing and integrating said 3-dimension picture data, and translating said 3-dimension picture data into a 3-dimension motion control signal to output after processing; and an output unit, coupled to said process unit, for receiving said 3-dimension motion control signal and outputting at least one Laser pulse to an object according to said 3-dimension motion control signal.

2. A 3-dimension scanning system as claimed in claim 1, wherein said input unit further comprises:

a VGA projector, for outputting an optical grating to an object waiting for scanning; and at least one digital camera, positioned at both sides of said VGA projector, for getting a 2-dimension image data from said object waiting for scanning according to said optical grating.

3. A 3-dimension scanning system as claimed in claim 1, wherein said process unit further comprises:

a personal computer, having a picture database, a gray level application program and a multiple pictures integrating program;

an image capture interface, coupled to said digital camera, for getting said 2-dimension image data;

a picture decode interface, coupled to said VGA projector, for decoding said 2-dimension image data and then getting said 3-dimension picture data, and outputting to said picture database for storing; and a 3-dimension motion control interface, for outputting said 3-dimension motion control signal to said output unit according to said 3-dimension picture data.

4. A 3-dimension scanning system as claimed in claim 1, wherein said output unit further comprises:

a laser pulse control apparatus, coupled to said 3-dimension motion control interface, having a Laser beam output program to output said Laser pulse according to said 3-dimension motion control signal;

a 3-dimension motion control platform, coupled to said Laser pulse control apparatus, for outputting said Laser pulse to said object.

5. A 3-dimension scanning system as claimed in claim 4, wherein said object preferably is made of transparent matter such as glass, crystal or acrylic plastic.

6. A method for scanning a 3-dimension object, for scanning an input image of an object and translating it into a 3-dimension picture data then outputting at least one laser pulse to an object, which comprises the following steps:

(a) using an input unit, for getting a 3-dimension picture data of an enlarged capture surface of said object;

(b) inputting said 3-dimension picture data to a process unit, and using a gray level application program of said process unit to determine a point coordinate of said 3-dimension picture data; and (c) establishing a 3-dimension error diffusion distributed table to execute point cloud.

7. A method for scanning a 3-dimension object as claimed in claim 6; wherein said input unit of step (a) further comprises:

a VGA projector, for outputting an optical grating to an object waiting for scanning; and at least one digital camera, positioned at both sides of said VGA projector, for getting a 2-dimension image data from said object waiting for scanning according to said optical grating.

8. A method for scanning a 3-dimension object as claimed in claim 6, wherein said process unit of step (b) further comprises:

a personal computer, having a picture database, a gray level application program and a multiple pictures integrating program;

an image capture interface, coupled to said digital camera, for getting said 2-dimension image data;

a picture decode interface, coupled to said VGA projector, for decoding said 2-dimension image data and then getting said 3-dimension picture data, and outputting to said picture database for storing; and a 3-dimension motion control interface, for outputting said 3-dimension motion control signal to said output unit according to said 3-dimension picture data.

* * * * *